United States Patent
Liss (10) Patent No.: US 9,280,140 B2
(45) Date of Patent: Mar. 8, 2016

(54) TEST TAKING PACING DEVICE AND RELATED METHODS

(71) Applicant: Jordan Liss, Northbrook, IL (US)

(72) Inventor: Jordan Liss, Northbrook, IL (US)

(73) Assignee: Testing Timers, Inc., Northbrook, IL (US)

(*) Notice: Subject to any disclaimer, the term of this patent is extended or adjusted under 35 U.S.C. 154(b) by 0 days.

(21) Appl. No.: 13/934,760

(22) Filed: Jul. 3, 2013

(65) Prior Publication Data

US 2014/0010054 A1  Jan. 9, 2014

Related U.S. Application Data (60) Provisional application No. 61/667,672, filed on Jul. 3, 2012.

(51) Int. Cl.
| | | |
|---|---|---|
| *G04F 3/06* | (2006.01) | |
| *G04G 11/00* | (2006.01) | |
| *G04F 1/00* | (2006.01) | |
| *G09B 5/00* | (2006.01) | |

(52) U.S. Cl.
CPC .... *G04F 3/06* (2013.01); *G04F 1/005* (2013.01); *G04G 11/00* (2013.01); *G09B 5/00* (2013.01)

(58) Field of Classification Search
CPC .......... G04F 1/005; G04F 3/06; G04G 11/00; G09B 5/00
USPC ................................. 368/107–112
See application file for complete search history.

(56) References Cited

U.S. PATENT DOCUMENTS

| | | | |
|---|---|---|---|
| 3,934,240 A | | 1/1976 | Norling |
| 4,052,799 A | | 10/1977 | Journot |
| 4,337,529 A | | 6/1982 | Morokawa |
| 5,050,141 A | | 9/1991 | Thinesen |
| 5,097,429 A | | 3/1992 | Wood et al. |
| 5,136,621 A | | 8/1992 | Mitchell et al. |
| 5,140,564 A | | 8/1992 | Rich |
| 5,337,290 A | | 8/1994 | Ventimiglia et al. |
| 5,357,487 A | | 10/1994 | Coleman, III |
| 5,386,990 A | | 2/1995 | Smith |
| 5,404,341 A | | 4/1995 | Horiguchi |
| 5,408,446 A | | 4/1995 | Ohira |
| 5,642,334 A | | 6/1997 | Liberman |
| 5,646,911 A | * | 7/1997 | Davis ............................. 368/10 |

(Continued)

OTHER PUBLICATIONS

International Search Report from corresponding PCT Application No. PCT/US2013/049306, dated Nov. 1, 2013 (2 pages).

(Continued)

*Primary Examiner* — Amy Cohen Johnson
*Assistant Examiner* — Matthew Powell
(74) *Attorney, Agent, or Firm* — Wood, Herron & Evans, LLP (57) ABSTRACT

A test taking pacing device includes a presentation screen and a plurality of selectors for operating the pacing device. The pacing device is configured to operate in a watch mode and a test mode having a plurality of test mode sections. In the watch mode, the time of day is displayed on the presentation screen. In the test mode and for each test mode section, a title representing the name of a test section, a total time for completing the test section, and a countdown timer are displayed on the presentation screen. The pacing device is further configured to selectively start and pause the countdown timer in each test mode section, and to select between the various test mode sections.

25 Claims, 6 Drawing Sheets

(56) References Cited

U.S. PATENT DOCUMENTS

| | | | |
|---|---|---|---|
| 5,694,376 A * | 12/1997 | Sullivan | 368/82 |
| 5,796,681 A * | 8/1998 | Aronzo | 368/10 |
| 5,813,757 A | 9/1998 | Tuke | |
| 5,854,774 A | 12/1998 | Timme | |
| 6,015,297 A | 1/2000 | Liberman | |
| 6,033,316 A | 3/2000 | Nixon | |
| 6,326,883 B1 | 12/2001 | Whitehead et al. | |
| 6,346,055 B1 | 2/2002 | Rege | |
| 6,646,958 B1 | 11/2003 | Geiger | |
| 6,795,375 B2 | 9/2004 | Streja | |
| 6,975,563 B2 | 12/2005 | de Brito | |
| 7,426,157 B2 | 9/2008 | Arnold et al. | |
| 7,843,770 B2 | 11/2010 | Orme | |
| 7,887,232 B1 | 2/2011 | Jones, Jr. | |
| 8,072,846 B2 | 12/2011 | Gordon et al. | |
| 2004/0008589 A1 | 1/2004 | McMillan et al. | |
| 2004/0156271 A1* | 8/2004 | Brito | 368/109 |
| 2004/0242295 A1 | 12/2004 | Ghaly | |
| 2005/0282132 A1* | 12/2005 | Brito | 434/304 |
| 2006/0203619 A1* | 9/2006 | Wigley | 368/223 |
| 2006/0256665 A1 | 11/2006 | Kadokura | |
| 2007/0287140 A1 | 12/2007 | Liebowitz | |
| 2008/0130422 A1* | 6/2008 | Hocherman | 368/107 |
| 2010/0061191 A1* | 3/2010 | Chen | 368/109 |
| 2011/0218765 A1* | 9/2011 | Rogers | 702/176 |
| 2013/0142015 A1* | 6/2013 | Terzian et al. | 368/71 |
| 2013/0170329 A1* | 7/2013 | Estrada et al. | 368/244 |
| 2013/0297663 A1* | 11/2013 | Estrada et al. | 708/111 |

OTHER PUBLICATIONS

Description of the ACT. Website [online]. ACT, Inc., 2011 [retrieved (by PCT Search Authority) on Sep. 25, 2013]. Retreived from the Internet on Archive.org: <URL:http://web.archive.org/web/20110905202301/http://www.actstudent.org/testprep/descriptions/>.

What is the SAT I?. Website [online]. Bespoke Education, 2010 [retreived (by the PCT Search authority) on Sep. 25, 2013]. Retreived from the Internet on Archive.org: <URL:http://web.archive.org/web/20101113212712/http://bespokeeducation.com/st_what-sat.cfm>.

Suunto, "Suunto Zoop—User's Guide," copyright Dec. 2009, available at http://www.si.edu/dive/pdfs/Suuntozoop_userguide.pdf.

International Preliminary Report on Patentability from corresponding PCT Application No. PCT/US2013/049306, dated Jan. 6, 2015 (8 pages).

* cited by examiner

TEST TAKING PACING DEVICE AND RELATED METHODS

REFERENCE TO PRIOR PROVISIONAL APPLICATION

This application claims the benefit of U.S. Provisional Application No. 61/667,672, filed Jul. 3, 2012, the content of which is hereby incorporated herein by reference in its entirety.

FIELD OF THE INVENTION

The present invention generally relates to pacing devices and to timers. More particularly, the invention relates to pacing devices useful for test taking.

BACKGROUND

Many students are required to, or choose to, take standardized tests as part of their educational experience. For example, college-bound students typically take a standardized college entrance exam. In the United States, the ACT® and SAT® are two examples of standardized tests that many college-bound students take. Undergraduate colleges and universities often consider a student's score on such standardized tests when making the determination of whether to admit the student to the school, or not.

Generally, students will want to score as highly as possible on these standardized tests in order to increase the likelihood of being admitted to a school. And students who hope to be admitted into a selective school often try to achieve very high scores. Therefore, many students spend time preparing for standardized tests, and some students are very serious about how they prepare. For example, taking practice tests and tutoring are common preparation strategies.

A typical standardized test includes multiple test sections, and each test section must be completed within a prescribed amount of time. For example, a standardized test might include a math test section that must be completed within thirty minutes. For some students, however, completing all the questions in a test section within the prescribed amount of time can be a challenge. And if a student is not mindful of the amount of time remaining for a test section, the time to complete the test section may expire before the student has completed all of the questions. Therefore, many students' preparation strategies also address the limited amount of time for completing test sections.

Different test sections might not necessarily have the same prescribed amount of time, however. For example, in addition to a math section that must be completed within thirty minutes, there might also be a reading section that must be completed within twenty minutes. This requires students to be aware of how much time is provided for different test sections. In addition, the number and type of test sections, and the prescribed amounts of time for each, can vary between standardized tests. For example, the ACT has five sections (English, Math, Reading, Science, and Writing) and the SAT has ten sections (three Writing, three Reading, three Math, and one Experimental). Thus, preparation strategies can also address the different amounts of time for completing various test sections, including for different tests.

It is therefore common for students to take practice exams under timed circumstances. Various devices have been used to keep track of time. For example, a student taking a practice test section that must be completed in thirty minutes can look at a clock or watch, observe the present time, and then determine the time by which the test section must be completed. If the student looks at the time again while taking the test section, he must determine how much time is remaining by either (1) determining the difference between the time by which the section must be completed and the then-present time; or (2) determining how much time has elapsed since beginning the test section, and determining the difference between thirty minutes (the prescribed amount of time) and the elapsed time. In either case, this requires the student to perform a mental calculation to determine the remaining time, which can distract the student from the substance of the test section and waste precious time.

Students have also kept track of time using countdown timers. For example, a wristwatch or a mobile phone might provide countdown timer capabilities. A student taking a practice test section that must be completed in thirty minutes can set the countdown timer for thirty minutes. The student can then start the countdown timer when he begins taking the test section. If the student looks at the countdown timer while taking the test section, he will observe the remaining time. When the countdown timer expires, there is typically a noise or a vibration to indicate that the prescribed time has ended. If the student proceeds to take a further practice test section that must be completed in a different amount of time, the student must change the countdown timer and set it for the different amount of time.

Some students prefer to follow consistent routines when preparing for standardized tests. For example, a student might consistently sit in a particular desk when taking practice tests, and might consistently use the same wristwatch to keep track of time.

Standardized tests are often administered to students in large rooms, such as gymnasiums or cafeterias, and under strict guidelines. For example, students are prohibited from having mobile phones and other electronic devices while taking a standardized test, including devices having wireless communication capabilities. In addition, even certain types of wristwatches might be prohibited, such as those that make noise or distract other test takers. Thus, the environment and circumstances under which the student actually takes the standardized test are likely to be different than those that the student had when preparing for the test. This change can cause frustration or anxiety for some students, which might impact their performance on the test.

SUMMARY

According to one embodiment of the invention, a test taking pacing device is provided and includes a presentation screen, a plurality of selectors for operating the pacing device, and a processor operatively coupled to the presentation screen and the plurality of selectors. The processor is configured to: in response to activation of a first selector, enter a first test mode section of a plurality of test mode sections. The processor is further configured to: in response to entering the first test mode section, cause the presentation screen to display a first title identifying a first section of a test to be timed, a total time allowed for completing the first section, and a countdown timer reflecting the total time for completing the first section. The processor is further configured to: in response to activation of a second selector, start the countdown timer and cause the presentation screen to display the remaining time for completing the first section. The processor is further configured to: in response to a further activation of the first selector, enter a second test mode section different from the first test mode section.

According to another embodiment of the invention, a method is provided for providing pacing information to a test taker. The method includes displaying on a presentation screen a first title identifying a first section of a test to be timed, and displaying on the presentation screen a total time allowed for completing the first section. The method further includes displaying on the presentation screen a countdown timer reflecting the total time for completing the first section, starting the countdown timer in response to activation of a first selector, and displaying on the presentation screen the remaining time for completing the first section.

According to another embodiment of the invention, a test taking pacing device is provided and includes a presentation screen and a plurality of selectors for operating the pacing device. The pacing device is configured to operate in a watch mode and a test mode having a plurality of test mode sections. In the watch mode, the time of day is displayed on the presentation screen. In the test mode and for each test mode section, a title representing the name of a test section, a total time for completing the test section, and a countdown timer are displayed on the presentation screen. The pacing device is further configured to selectively start and pause the countdown timer in each test mode section, and to select between the various test mode sections.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
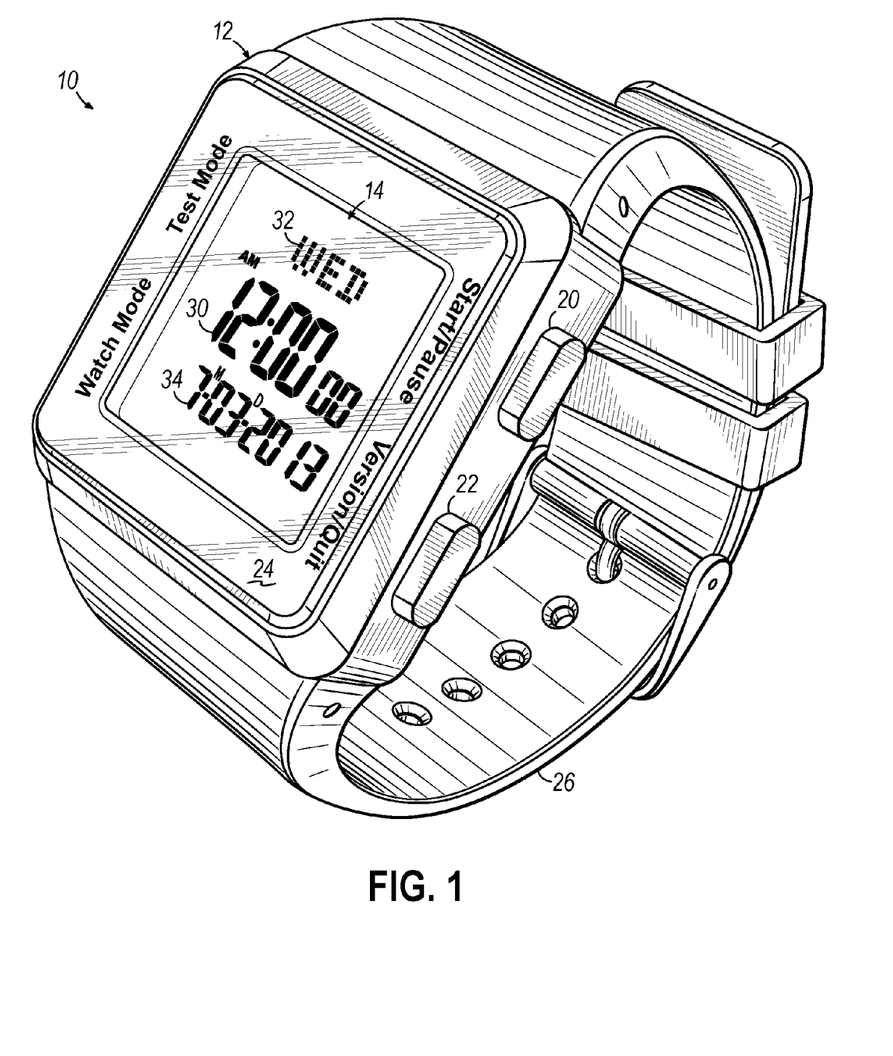
FIG. 1 is an isometric view showing a test taking pacing device constructed according to an embodiment of the invention.
Figure 2:
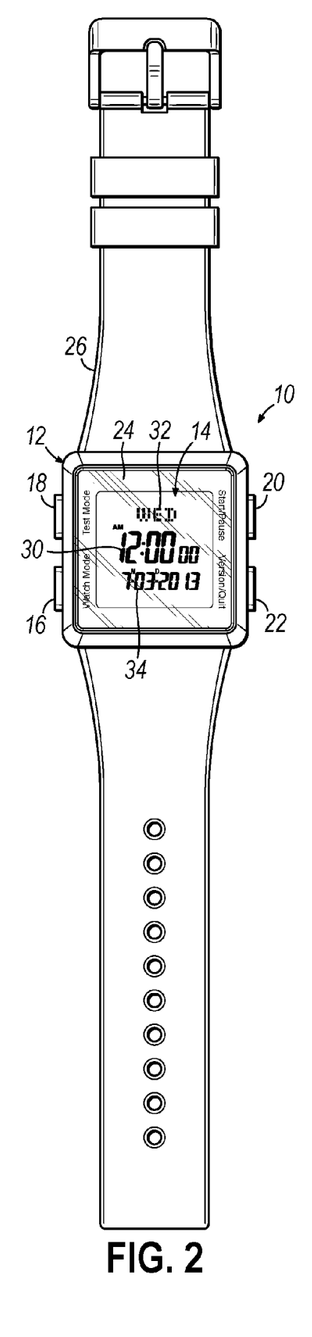
FIG. 2 is a plan view showing the pacing device of FIG. 1.

Referring to the figures, and beginning with FIGS. 1 and 2, an exemplary test taking pacing device is shown and is generally indicated by the numeral 10. In the embodiment shown, the pacing device 10 is in the form of a wristwatch, and includes a body 12 having a presentation screen 14 and selectors 16, 18, 20, 22 positioned around the screen 14. As shown, the selectors are generally adjacent to and associated with labels on the pacing device 10, with selector 16 being associated with the label "Watch Mode," selector 18 being associated with the label "Test Mode," selector 20 being associated with the label "Start/Pause," and selector 22 being associated with the label "Version/Quit." These labels are provided near the periphery 24 of the screen 14 and communicate information to a user of the pacing device 10 relating to the functions and operation of the pacing device 10. The selectors 16, 18, 20, 22 are used to operate the pacing device 10, and are all push-button type selectors, but other types of selectors could also be used, such as touch-screen selectors incorporated in the screen 14, icons displayed on the screen 14, and any other suitable type of selector.

The body 12 also includes a wrist strap 26, allowing the pacing device 10 to be worn like a wristwatch. It will be appreciated, however, that the pacing device 10 could be embodied in different forms. For example, the pacing device 10 could include a support stand for allowing it to sit upright on a flat surface, such as a desk, or might have a different form that is wearable by a user, such as on a necklace. Moreover, it will also be appreciated that the pacing device 10 could be embodied in a suitable computing device, such as a smartphone, tablet computer, laptop computer, desktop computer, and others. For example, the user interface of any such computing device could provide the screen 14 and the selectors 16, 18, 20, 22 of the pacing device 10.

In any event, and as will be apparent from the following discussion, the pacing device 10 is useful for preparing for a standardized test, such as the ACT or SAT. In addition to preparing for a standardized test, the pacing device can also be useful for taking the actual administration of a standardized test. Moreover, and in the embodiment shown, the pacing device 10 is also useful as a wristwatch for displaying the time of day, the date, and other typical information conveyed by a wristwatch.

Figure 3:
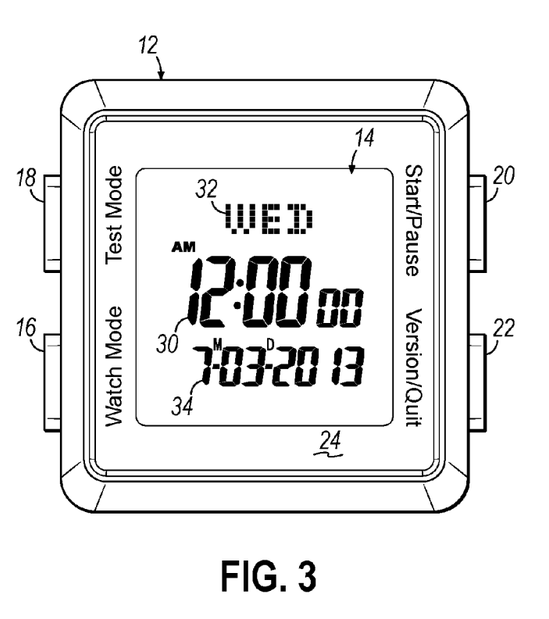
FIG. 3 is a plan view showing the presentation screen of the pacing device of FIG. 1, with the pacing device operating in a watch mode.

The pacing device 10 is configured to operate in two modes: a watch mode and a test mode. In the watch mode, the pacing device 10 operates like a typical wristwatch and displays typical wristwatch-type information on the screen 14. A user selects the watch mode by pressing, or activating, the selector 16 (which is associated with the label "Watch Mode"). As shown in FIGS. 1-3, when in the watch mode, the time of day is displayed on the screen 14, as indicated at 30. In addition, the day of the week is also displayed, as indicated at 32, and the date is displayed, as indicated at 34.

As shown, the time of day is displayed in 12-hour format, with AM and PM being displayed, as appropriate. Also, the time of day is indicated in terms of hours, minutes, and seconds. Also as shown, the day of the week is displayed as an abbreviation, with "WED" standing for Wednesday. Finally, the date is displayed in month-day-year format. It will be appreciated, however, that other formats could also be used for presenting any of the time of day, day of the week, or date information.

Referring next to FIGS. 4-7, the test mode operation of the pacing device 10 is described. In the test mode, the pacing device 10 is configured to present information and provide features that are useful both for preparing for and for taking a standardized test. The following discussion will be presented with information and features that pertain to the ACT and SAT standardized tests and their extended time versions, but it will be appreciated that the pacing device 10 could also provide test mode features relevant to other tests as well, such as the GMAT, BAR, AP, and every-day school tests.

Figure 4:
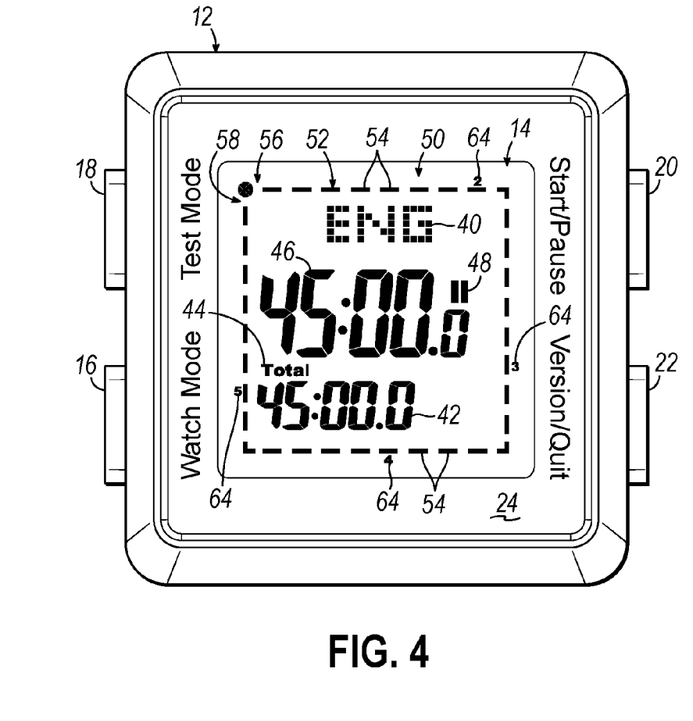
FIGS. 4 and 5 are plan views like FIG. 3, with the pacing device operating in a test mode, with FIG. 4 showing a state before a countdown timer has started, and FIG. 5 showing a state after the countdown timer has run for a period of time.

A user selects the test mode by pressing the selector 18 (which is associated with the label "Test Mode"). In the test mode, the pacing device 10 displays several pieces of information about the various test sections of a standardized test. In particular, the test mode includes a plurality of test mode sections that generally correspond with the sections of a standardized test. FIG. 4 shows features of an exemplary test mode section.

As shown in FIG. 4, the information displayed by the pacing device 10 in the test mode includes a title 40 that identifies a section of a standardized test. For example, FIG. 4 shows that the title 40 is "ENG" which stands for English.

The information displayed by the pacing device 10 in the test mode also includes a total time 42 that is allowed for completing the given test section. In FIG. 4, the total time 42 for completing the English test section is forty-five minutes, which is displayed as 45:00.0. Optionally, the word "Total" is also displayed near the total time 42, as indicated at 44. For example, the ACT standardized test includes an English test section that must be completed in forty-five minutes.

The information displayed by the pacing device 10 in the test mode also includes a countdown timer 46 that indicates the remaining time for completing a given test section, which in FIG. 4 shows the remaining time for completing the English test section. FIG. 4 shows the pacing device 10 before the countdown timer 46 has been started, so the countdown timer 46 reflects the total time for completing the English test section, which is forty-five minutes. Before the countdown timer 46 is started, the pacing device 10 displays a pause symbol, as indicated at 48, near the countdown timer 46. A user starts the countdown timer 46 by pressing the selector 20. And once the countdown timer 46 has been started, it can be paused by pressing the selector 20. After being paused, the countdown timer 46 can be started again by pressing the selector 20.

Optionally, the pacing device 10 can include features that prevent inadvertent disruption of the countdown timer 46. For example, the pacing device 10 can be configured so that once the countdown timer 46 has been started and is not paused, all of the selectors are essentially deactivated other than the selector 20, and no action is taken in response to pressing any of the selectors 16, 18, and 22. Thereby, when the countdown timer 46 is counting down time, the only option is to pause the countdown timer 46 by pressing the selector 20.

The information displayed by the pacing device 10 in the test mode also includes a progress indicator 50. In the embodiment shown, the progress indicator 50 includes a pacing track 52 that is positioned around the title 40, the total time 42, and the countdown timer 46. The pacing track 52 is generally near the periphery 24 of the screen 14 and includes a plurality of segments 54 that extend between a first end 56 and a second end 58. First and second ends 56, 58 are located in the upper left corner of the screen 14, and the segments 54 extend generally around the periphery of the screen 14. Particularly, the segments 54 extend from the first end 56 over to the upper right corner of the screen 14, down to the lower right corner of the screen 14 over to the lower left corner of the screen 14, and up to the upper left corner of the screen 14 at the second end 58.

Generally, the amount of the pacing track 52 that is displayed on the screen 14 is in relationship to the remaining time for completing a given test section. Thus, in FIG. 4, which shows the English test section before the countdown timer 46 has started, the entire pacing track 52 is shown. As the remaining time for completing a given test section decreases, the amount of the pacing track 52 that is displayed on the screen 14 between the first and second ends 56, 58, decreases. In particular, a decreasing number of the segments 54 are displayed as the remaining time decreases.

Figure 5:
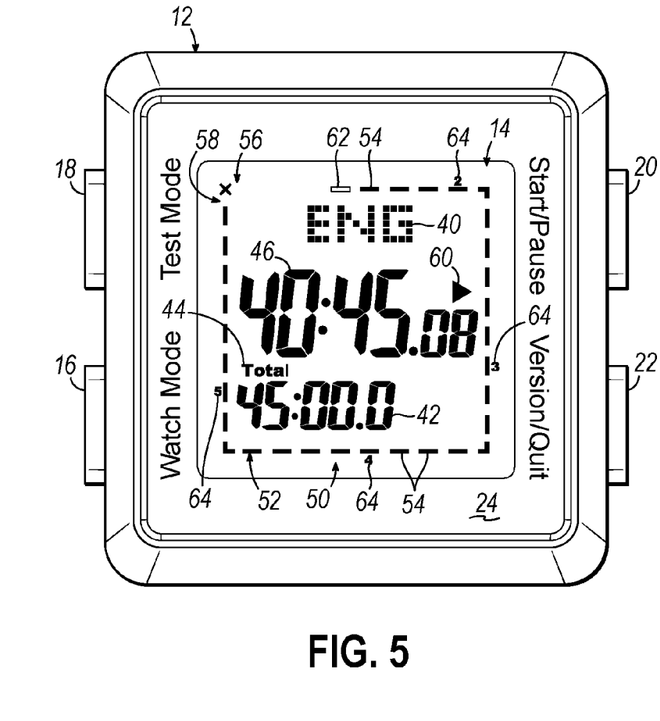

FIG. 5 shows a snapshot of the pacing device 10 after the countdown timer 46 has run for a period of time. In particular, the countdown timer 46 shows that there are forty minutes and 45.08 seconds remaining for completing the English test section. As the countdown timer is running, a play symbol is displayed, as indicated at 60. Also as the countdown timer is running, the pacing track 52 changes to generally reflect the remaining time for completing the English test section. As shown in FIG. 5, several of the segments 54 are no longer displayed and a tail segment 62 is used to indicate a progress position that generally reflects the elapsed time since beginning the English test section. The tail segment 62 is shown in outline in FIG. 5 to indicate the option that the tail segment 62 may blink on the screen 14. Thereby, the tail segment 62 will appear to travel clockwise from the first end 56 to the second end 58, and blink along the way.

In addition to the pacing track 52, the progress indicator 50 can include one or more progress markers 64 that are displayed on the screen 14 and represent a portion of a given test section that should be completed by a given time. For example, FIGS. 4 and 5 show the numerals "2," "3," "4," and "5" as progress markers 64 near and evenly spaced about the pacing track 52. The progress markers 64 shown in FIGS. 4 and 5 reflect the fact that the English test section of the ACT standardized test includes five passages. The progress markers 64 are generally positioned nearby the pacing track 52 so that the progress markers 64 and the pacing track 52 can be interpreted together to provide an indication of how far along a user should be in a given test section at any point in time. For example, and with reference to FIG. 5, when the tail segment 62 of the pacing track 52 is between the first end 56 and the progress marker "2," a user should be approximately halfway finished with the first passage. In a similar manner, when the tail segment 62 has reached the progress marker "2," the user should have just completed the first passage and should be beginning on the second passage. It will be appreciated that the progress markers 64 displayed on the screen 14 can also reflect the number of questions in a test section, the elapsed time, or any other appropriate value, and can also be positioned at any relevant position along the pacing track 52 to reflect the portion of a test section that should be completed by a given time.

Figure 6:
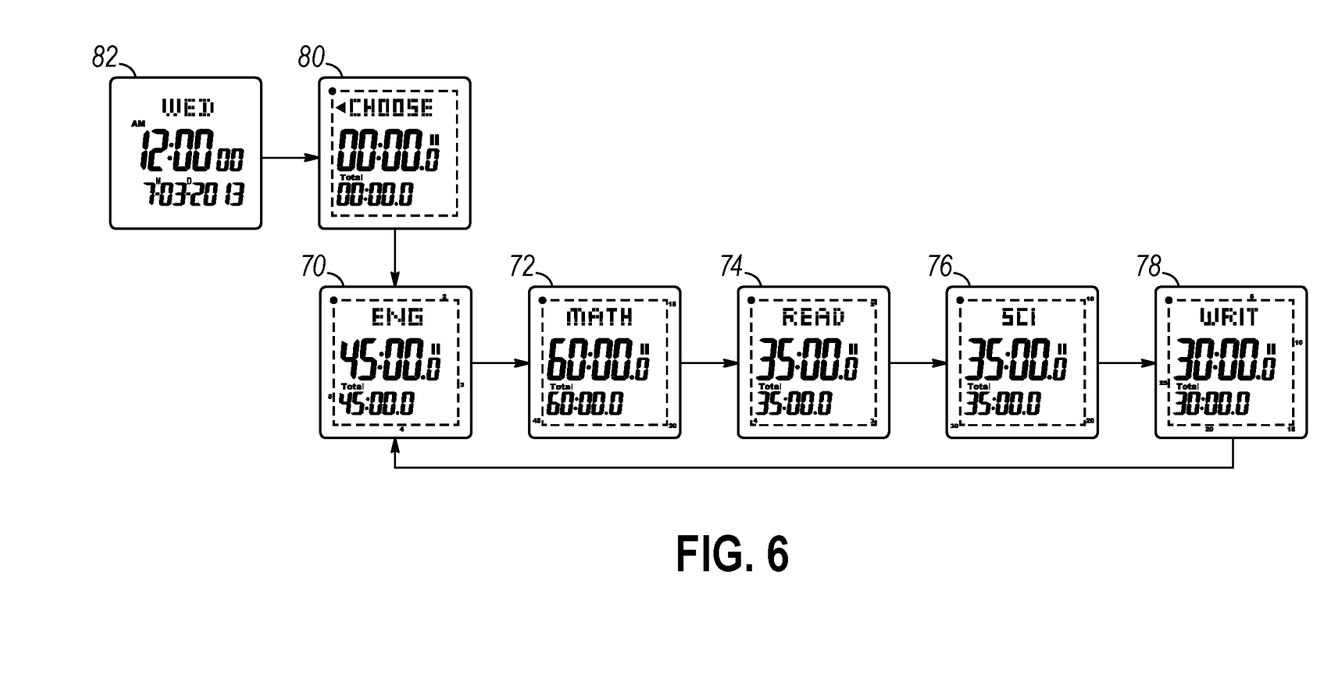
FIG. 6 is a schematic depiction of several test mode sections of the pacing device of FIG. 1 that generally correspond with the test sections of the ACT standardized test.
Figure 7:
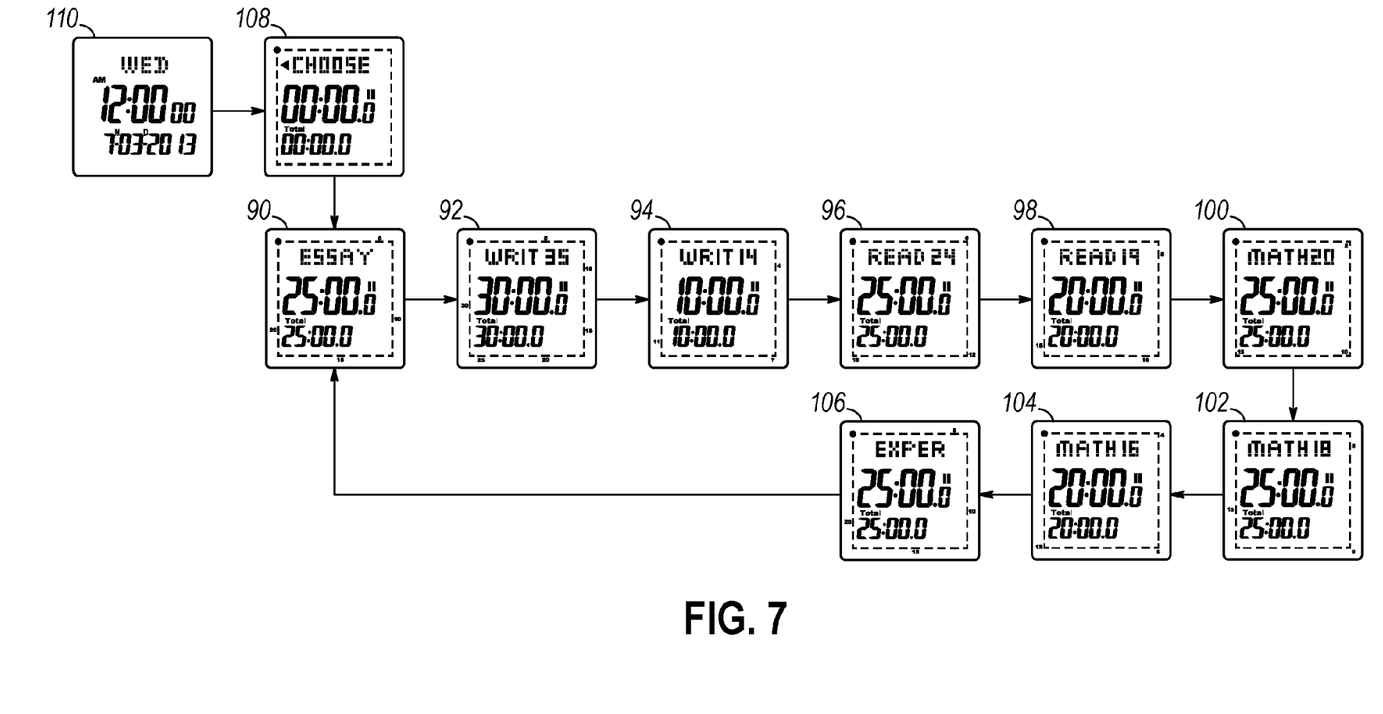
FIG. 7 is a schematic depiction of several test mode sections of the pacing device of FIG. 1 that generally correspond with the test sections of the SAT standardized test.

Referring next to FIGS. 6 and 7, various features relating to the pacing device 10 and the ACT and SAT standardized tests are shown. In particular, FIG. 6 shows a plurality of test mode sections that relate to the ACT standardized test, and FIG. 7 shows a plurality of test mode sections that relate to the SAT standardized test.

The ACT standardized test (hereafter "ACT") includes five test sections: English, Math, Reading, Science, and Writing. The pacing device 10 can include test mode features relating to each of these test sections. For example, the pacing device 10 can include test mode sections corresponding with each of the test sections of the ACT. Thus, the pacing device 10 can include an English test mode section, as indicated at 70, a Math test mode section, as indicated at 72, a Reading test mode section, as indicated at 74, a Science test mode section, as indicated at 76, and a Writing test mode section, as indicated at 78. Each of these test mode sections 70, 72, 74, 76, 78 includes the above described title, total time, countdown timer, and progress indicator features.

For example, the English test mode section 70 includes the title "ENG" and reflects a total time of forty-five minutes for completing the English test section of the ACT. The progress markers displayed in the English test mode section 70 reflect that there are five passages in the English test section of the ACT, and include the numerals "2," "3," "4," and "5" evenly spaced around the pacing track. The English test section of the ACT includes 75 questions, and so progress markers could also be provided relating the number of questions that should be completed by a given time.

The Math test mode section 72 includes the title "MATH" and reflects a total time of sixty minutes for completing the Math test section of the ACT. The progress markers displayed in the Math test mode section 72 reflect that there are sixty questions in the Math test section of the ACT, and include the numerals "15," "30," and "45" evenly spaced around the pacing track (in the corners).

The Reading test mode section 74 includes the title "READ" and reflects a total time of thirty-five minutes for completing the Reading test section of the ACT. The progress markers displayed in the Reading test mode section 74 reflect that there are four passages in the Reading test section of the ACT, and include the numerals "2," "3," and "4" evenly spaced around the pacing track (in the corners). The Reading test section of the ACT includes forty questions, and so progress markers could also be provided relating the number of questions that should be completed by a given time.

The Science test mode section 76 includes the title "SCI" and reflects a total time of thirty-five minutes for completing the Science test section of the ACT. The progress markers displayed in the Science test mode section 76 reflect that there are forty questions in the Science test section of the ACT, and include the numerals "10," "20," and "30" evenly spaced around the pacing track (in the corners). The Science test section of the ACT includes 7 passages, and so progress markers could also be provided relating the number of passages that should be completed by a given time.

The Writing test mode section 78 includes the title "WRIT" and reflects a total time of thirty minutes for completing the Writing test section of the ACT. The progress markers displayed in the Writing test mode section 78 reflect that there is one prompt that must be completed in thirty minutes, and include the numerals "5," "10," "15," "20," and "25" evenly spaced around the pacing track, representing the elapsed amount of time.

Information relating to the test sections for the ACT is summarized in the following table.

| ACT Standardized Test Information | | |
| --- | --- | --- |
| Test Section | Total Time | Content |
| English | 45 minutes | 5 passages, 75 questions |
| Math | 60 minutes | 60 questions |
| Reading | 35 minutes | 4 passages, 40 questions |
| Science | 35 minutes | 7 passages, 40 questions |
| Writing | 30 minutes | 1 prompt |

A user selects a desired test mode section by pressing the selector 18 until the desired test mode section appears on the screen 14. Optionally, and as shown in FIG. 6, a launch screen can be provided, as indicated at 80, that displays an instruction of "CHOOSE" with an arrow pointing at the portion of the screen 14 adjacent the selector 18. Thus, with the pacing device 10 in watch mode, as indicated at 82, pressing the selector 18 takes the user to the launch screen 80. Then, subsequent pressing of the selector 18 takes the user to the English test mode section 70. In a similar manner, subsequent pressing of the selector 18 takes the user sequentially to the Math test mode section 72, to the Reading test mode section 74, to the Science test mode section 76, and to the Writing test mode section 78. From the Writing test mode section 78, subsequent pressing of the selector 18 takes the user back to the English test mode section 70, as shown.

While FIG. 6 shows the test mode sections 70, 72, 74, 76, and 78 in a particular order, it will be appreciated that they could be presented to a user in any order.

The SAT standardized test (hereafter "SAT") includes ten sections: three Writing, three Reading, three Math, and one Experimental. The pacing device 10 can include test mode features relating to each of these test sections. For example, the pacing device 10 can include test mode sections corresponding with each or several of the test mode sections of the SAT. Thus, and referring next to FIG. 7, the pacing device 10 can include an Essay test mode section, as indicated at 90, a first Writing test mode section, as indicated at 92, and a second Writing test mode section, as indicated at 94. The one Essay and two Writing test mode sections 90, 92, 94 generally correspond with the three Writing test sections of the SAT. The pacing device 10 can also include a first Reading test mode section, as indicated at 96, and a second Reading test mode section, as indicated at 98. Because two of the Reading sections on the SAT must be completed in the same amount of time, one of the Reading test mode sections 96, 98 can be used twice. Thereby, the two Reading test mode sections 96, 98 generally correspond with the three Reading test sections of the SAT. The pacing device 10 can also include a first Math test mode section, as indicated at 100, a second Math test mode section, as indicated at 102, and a third Math test mode section, as indicated at 104. The three Math test mode sections 100, 102, 104 generally correspond with the three Math test sections of the SAT. The pacing device 10 can also include an Experimental test mode section, as indicated at 106, which generally corresponds with the Experimental section of the SAT.

The Essay test mode section 90 includes the title "ESSAY" and reflects a total time of twenty-five minutes for completing the Essay test section, which is part of the three Writing test sections of the SAT. The progress markers displayed in the Essay test mode section 90 reflect that there is one prompt that must be completed in twenty-five minutes, and include the numerals "5," "10," "15," and "20" evenly spaced around the pacing track.

The first Writing test mode section 92 includes the title "WRIT35," which indicates that there are thirty-five questions, and reflects a total time of thirty minutes for completing this Writing test section. The progress markers displayed in the first Writing test mode section 92 reflect that there are thirty-five questions, and include the numerals "5," "10," "15," "20," "25," and "30" evenly spaced around the pacing track.

The second Writing test mode section 94 includes the title "WRIT14," which indicates that there are fourteen questions, and reflects a total time of ten minutes for completing this Writing test section. The progress markers displayed in the second Writing test mode section 94 reflect that there are fourteen questions, and include the numerals "4," "7," and "11" spaced around the pacing track.

The first Reading test mode section 96 includes the title "READ24," which indicates that there are twenty-four questions, and reflects a total time of twenty-five minutes for completing this Reading test section. The progress markers displayed in the first Reading test mode section 96 reflect that there are twenty-four questions, and include the numerals "6," "12," and "18" evenly spaced around the pacing track (in the corners). Because the SAT includes two Reading sections that must both be completed in twenty-five minutes, the first Reading test mode section 96 can be used for both of those two Reading sections.

The second Reading test mode section 98 includes the title "READ19," which indicates that there are nineteen questions, and reflects a total time of twenty minutes for completing this Reading test section. The progress markers displayed in the second Reading test mode section 98 reflect that there are nineteen questions, and include the numerals "5," "10," and "15" spaced around the pacing track.

The first Math test mode section 100 includes the title "MATH20," which indicates that there are twenty questions, and reflects a total time of twenty-five minutes for completing this Math test section. The progress markers displayed in the first Math test mode section 100 reflect that there are twenty questions, and include the numerals "5," "10," and "15" evenly spaced around the pacing track (in the corners).

The second Math test mode section 102 includes the title "MATH18," which indicates that there are eighteen questions, and reflects a total time of twenty-five minutes for completing this Math test section. The progress markers displayed in the second Math test mode section 102 reflect that there are eighteen questions, and include the numerals "5," "9," and "15" spaced around the pacing track.

The third Math test mode section 104 includes the title "MATH16," which indicates that there are sixteen questions, and reflects a total time of twenty minutes for completing this Math test section. The progress markers displayed in the third Math test mode section 104 reflect that there are sixteen questions, and include the numerals "4," "8," and "12" evenly spaced around the pacing track (in the corners).

The Experimental test mode section 106 includes the title "EXPER" and reflects a total time of twenty-five minutes for completing the Experimental test section. The progress markers displayed in the Experimental test mode section 106 reflect that there are twenty-five minutes for completing the Experimental test section, and include the numerals "5," "10," "15," and "20" evenly spaced around the pacing track.

Information relating to the test sections for the SAT is summarized in the following table.

| SAT Standardized Test Information | | |
|---|---|---|
| Test Section | Total Time | Content |
| Essay | 25 minutes | 1 prompt |
| Writing | 25 minutes | 35 questions |
| Writing | 10 minutes | 14 questions |
| Reading | 25 minutes | 24 questions |
| Reading | 25 minutes | 24 questions |
| Reading | 20 minutes | 19 questions |
| Math | 25 minutes | 20 questions |
| Math | 25 minutes | 18 questions |
| Math | 20 minutes | 16 questions |
| Experimental | 25 minutes | varied |

A user selects a desired test mode section by pressing the selector 18 until the desired test mode section appears on the screen 14. Optionally, and as shown in FIG. 7, a launch screen can be provided, as indicated at 108, that displays an instruction of "CHOOSE" with an arrow pointing at the portion of the screen 14 adjacent the selector 18. Thus, with the pacing device 10 in watch mode, as indicated at 110, pressing the selector 18 takes the user to the launch screen 108. Then, subsequent pressing of the selector 18 takes the user to the Essay test mode section 90. In a similar manner, subsequent pressing of the selector 18 takes the user sequentially to the first Writing test mode section 92, to the second Writing test mode section 94, to the first Reading test mode section 96, to the second Reading test mode section 98, to the first Math test mode section 100, to the second Math test mode section 102, to the third Math test mode section 104, and to the Experimental test mode section 106. From the Experimental test mode section 106, subsequent pressing of the selector 18 takes the user back to the Essay test mode section 90, as shown.

While FIG. 7 shows the test mode sections 90, 92, 94, 96, 98, 100, 102, 104, and 106 in a particular order, it will be appreciated that they could be presented to a user in any order.

A pacing device 10 constructed according to the concepts disclosed herein could include any or all the test mode sections shown in FIGS. 6 and 7, including a combination of all the test mode sections shown in FIGS. 6 and 7, thereby providing test mode sections that correspond with both the ACT and SAT.

In each test mode section (including 70, 72, 74, 76, 78, and 90, 92, 94, 96, 98, 100, 102, 104, 106), a user starts and pauses the countdown timer 46 as discussed above in association with the description of FIGS. 3 and 4. In particular, pressing the selector 20 starts and pauses the countdown timer 46.

If a user has started any of the test mode sections (including 70, 72, 74, 76, 78, and 90, 92, 94, 96, 98, 100, 102, 104, 106), but wishes to abandon a particular test mode section for any reason, the test mode section can be quit by pressing the selector 22 (which is associated with the label "Version/Quit"). And while it is not shown in the figures, the pacing device 10 can present an instruction asking the user to confirm whether to quit a test mode section by pressing an appropriate one of the selectors 16, 18, 20, 22. Once a particular test mode section has been quit, the pacing device 10 can either reset the countdown timer 46 for the particular test mode section or display the launch screen, such as 80 or 108, thereby prompting a user to choose another test mode section.

Optionally, the pacing device 10 can include features that prevent inadvertent selection of another test mode section or the watch mode once the countdown timer 46 has been started in a particular test mode section. For example, once the countdown timer 46 has been started in a particular test mode section, the selectors 16, 18 are essentially deactivated, and no action is taken in response to pressing selectors other than the selectors 20, 22. Thereby, the user cannot select another test mode section or the watch mode of the pacing device 10.

Advantageously, the pacing device 10 does not include any noise-making, light-producing, or vibrating features or functions. Also advantageously, the pacing device 10 does not include any telephone, calculator, and camera features or functions, and cannot accept headphones. Also advantageously, the pacing device 10 may be configured so as to only operate in the watch and test modes, as described above, or only the test mode.

Figure 8:
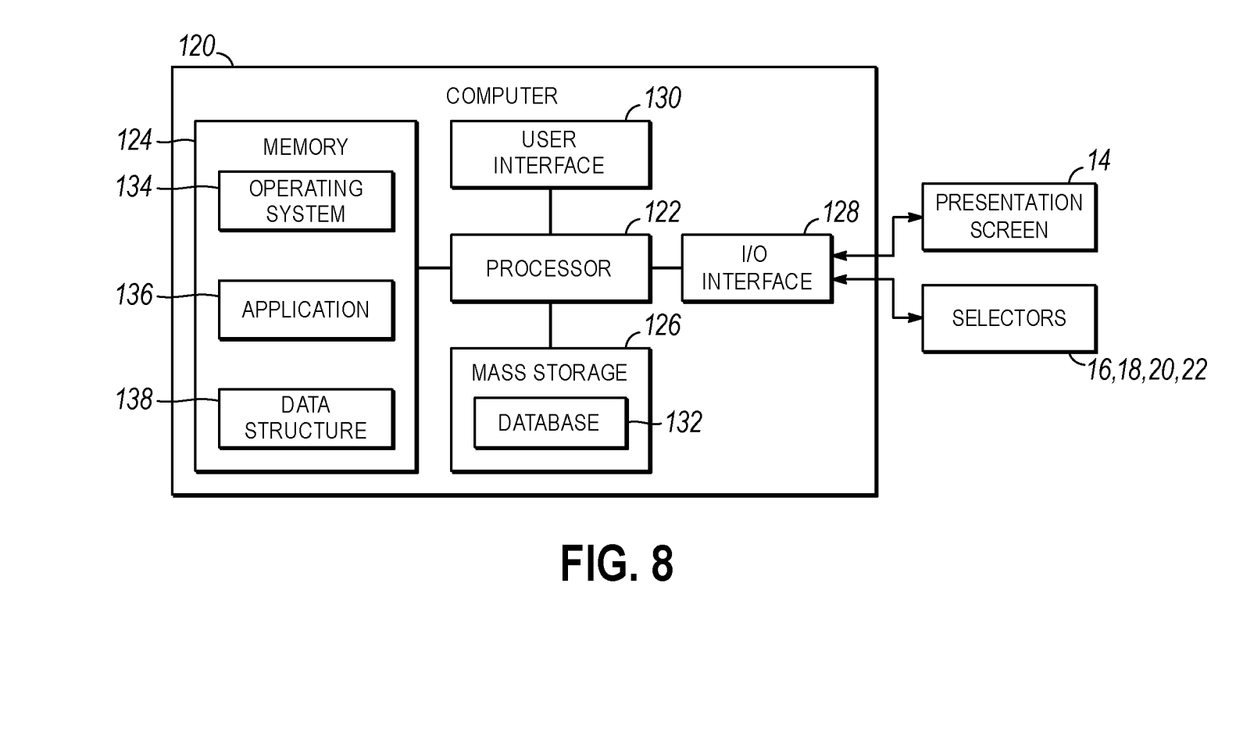
FIG. 8 is a schematic depiction of a computer system for implementing the pacing device of FIG. 1.

Referring now to FIG. 8, the pacing device 10 may be implemented with one or more computer devices or systems, such as exemplary computer system 120. The computer system 120 may include a processor 122, a memory 124, a mass storage memory device 126, an input/output (I/O) interface 128, and a user interface 130.

The processor 122 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 124. Memory 124 may include a single memory device or a plurality of memory devices including but not limited to read-only memory (ROM), random access memory (RAM), volatile memory, non-volatile memory, static random access memory (SRAM), dynamic random access memory (DRAM), flash memory, cache memory, or any other device capable of storing information. The mass storage memory device 126 may include data storage devices such as a hard drive, optical drive, tape drive, non-volatile solid state device, or any other device capable of storing information. A database 132 may reside on the mass storage memory device 126, and may be used to collect and organize data used by the various systems and modules described herein. For example, the database 132 may be used to store title and total time information for the various test mode sections.

Processor 122 may operate under the control of an operating system 134 that resides in memory 124. The operating system 134 may manage computer resources so that computer program code embodied as one or more computer software applications, such as application 136 residing in memory 124 may have instructions executed by the processor 122. In an alternative embodiment, the processor 122 may execute the application 136 directly, in which case the operating system 134 may be omitted. One or more data structures 138 may also reside in memory 124, and may be used by the processor 122, operating system 134, and/or application 136 to store or manipulate data.

The I/O interface 128 may provide a machine interface that operatively couples the processor 122 to other devices and systems, such as the presentation screen 14 and the selectors 16, 18, 20, 22. The application 136 may thereby work cooperatively with the presentation screen 14 and the selectors 16, 18, 20, 22 by communicating via the I/O interface 128 to provide the various features, functions, and/or modules comprising embodiments of the invention. The application 136 may also have program code that is executed by one or more external resources, or otherwise rely on functions and/or signals provided by other system or network components external to the computer system 120. Indeed, given the nearly endless hardware and software configurations possible, persons having ordinary skill in the art will understand that embodiments of the invention may include applications that are located externally to the computer system 120, distributed among multiple computers or other external resources, or provided by computing resources (hardware and software) that are provided as a service over a network, such as a cloud computing service.

The user interface 130 may be operatively coupled to the processor 122 of computer system 120 in a known manner to allow a user to interact directly with the computer system 120. The user interface 130 may include video and/or alphanumeric displays, a touch screen, a speaker, and any other suitable audio and visual indicators capable of providing information to the user. The user interface 130 may also include input devices and controls such as an alphanumeric keyboard, a pointing device, keypads, pushbuttons, control knobs, microphones, etc., capable of accepting commands or input from the user and transmitting the entered input to the processor 122.

In particular, it is contemplated that the process 122 is configured to receive inputs from the various selectors 16, 18, 20, and 22, and to cause the presentation screen 14 to display certain information in response thereto, including any of the features discussed above with respect to the watch mode and test mode of the pacing device 10.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A test taking pacing device, comprising:
   a presentation screen,
   a plurality of selectors for operating the pacing device, and
   a processor operatively coupled to the presentation screen and the plurality of selectors, the processor being configured to:
      in response to activation of a first selector, enter a first test mode section of a plurality of test mode sections,
      in response to entering the first test mode section, cause the presentation screen to display a first title identifying a first section of a test to be timed, a total time allowed for completing the first section, and a countdown timer reflecting the total time for completing the first section,
      in response to entering the first test mode section, cause the presentation screen to display a progress indicator simultaneously with and separate from the countdown timer,
      wherein the progress indicator includes a pacing track positioned around the first title, the total time, and the countdown timer, the pacing track having a plurality of distinct segments extending between a first end and a second end, each of the distinct segments representing a portion of the total time for completing the first section, the progress indicator further including a plurality of progress markers arranged along the pacing track, each progress marker being visually unique relative to each of the other progress markers for providing a visual indication of a corresponding portion of the first section that should be completed by a given time,
      in response to activation of a second selector:
         start the countdown timer,
         cause the presentation screen to display, with the countdown timer, a remaining time of the total time for completing the first section while the presentation screen displays the total time, and
         cause the progress indicator to provide a changeable visual indication responsive to the remaining time for completing the first section, including causing a size of the pacing track to decrease by displaying sequentially fewer of the distinct segments between the first and second ends in response to a decrease in the remaining time, and
      in response to a further activation of the first selector, enter a second test mode section different from the first test mode section and corresponding to a second section of the test.

2. The test taking pacing device of claim 1, the processor being further configured to:
   in response to a further activation of the second selector, pause the countdown timer and cause the presentation screen to display the remaining time for completing the first section.

3. The test taking pacing device of claim 2, the processor being further configured to:
   in response to activation of a third selector, quit the first test mode section.

4. The test taking pacing device of claim 3, the processor being further configured to:

take no action in response to activation of the selectors other than the second selector and the third selector when the countdown timer has been paused.

5. The test taking pacing device of claim 3, the processor being further configured to:
in response to activation of a fourth selector, enter a watch mode, and in response to entering the watch mode, cause the presentation screen to display the time of day.

6. The test taking pacing device of claim 5, the processor being further configured to:
in response to entering the watch mode, further cause the presentation screen to display at least one of the day of the week and the date.

7. The test taking pacing device of claim 2, the processor being further configured to:
take no action in response to activation of the selectors other than the second selector when the countdown timer has been started and is not paused.

8. The test taking pacing device of claim 1, wherein the pacing track is positioned generally near the periphery of the presentation screen.

9. The test taking pacing device of claim 1, the processor being further configured to:
in response to activation of the first selector, and before entering the first test mode section, cause the presentation screen to display an instruction for a user to further activate the first selector, whereby the first test mode section is entered upon a further activation of the first selector.

10. The test taking pacing device of claim 1, wherein the plurality of test mode sections includes an English test mode section, a Math test mode section, a Reading test mode section, a Writing test mode section, and a Science test mode section.

11. The test taking pacing device of claim 1, wherein the plurality of test mode sections includes an Essay test mode section, a Math test mode section, and a test mode section corresponding to a test section having at least one of a reading portion or a writing portion.

12. The test taking pacing device of claim 1, wherein the plurality of distinct segments of the pacing track includes a tail segment at the second end, the processor being further configured to:
in response to activation of the second selector, cause the presentation screen to display the tail segment differently than the remaining displayed segments of the pacing track.

13. The test taking pacing device of claim 1, wherein the progress markers indicate a plurality of elements corresponding to the first section, the plurality of elements including at least one of a plurality of subparts of the first section or a plurality of elapsed increments of the total time for completing the first section.

14. The test taking pacing device of claim 13, wherein the plurality of elements includes at least one of a plurality of questions of the first section or a plurality of passages of the first section.

15. The test taking pacing device of claim 1, wherein in the second test mode section the processor causes the presentation screen to display a progress track having a plurality of distinct segments, each of the distinct segments of the progress track displayed in the second test mode section representing a portion of a total time for completing the second section, and
wherein each of the distinct segments of the progress track displayed in the first test mode section represents a first period of time and each of the distinct segments of the progress track displayed in the second test mode section represents a second period of time different than the first period of time.

16. The test taking pacing device of claim 1, wherein the distinct segments of the pacing track are spaced apart from one another so as to be individually displayed.

17. A method of providing pacing information to a test taker, the method comprising:
displaying on a presentation screen a first title identifying a first section of a test to be timed,
displaying on the presentation screen a total time allowed for completing the first section,
displaying on the presentation screen a countdown timer reflecting the total time for completing the first section,
starting the countdown timer in response to activation of a first selector,
displaying on the presentation screen, with the countdown timer, a remaining time of the total time for completing the first section while displaying the total time,
displaying on the presentation screen a progress indicator simultaneously with and separate from the countdown timer,
wherein the progress indicator includes a pacing track positioned around the first title, the total time, and the countdown timer, the pacing track having a plurality of distinct segments extending between a first end and a second end, each of the distinct segments representing a portion of the total time for completing the first section, the progress indicator further including a plurality of progress markers arranged along the pacing track, each progress marker being visually unique relative to each of the other progress markers for providing a visual indication of a corresponding portion of the first section that should be completed by a given time, and
providing with the progress indicator a changeable visual indication responsive to the remaining time for completing the first section, including decreasing a size of the pacing track by displaying sequentially fewer of the distinct segments between the first and second ends in response to a decrease in the remaining time.

18. The method of claim 17, further comprising:
displaying the time of day in response to activation of a second selector.

19. A test taking pacing device, comprising:
a presentation screen, and
a plurality of selectors for operating the pacing device,
the pacing device being configured to operate in a watch mode and a test mode having a plurality of test mode sections,
whereby in the watch mode, the time of day is displayed on the presentation screen, and
whereby in the test mode and for each test mode section, a title representing the name of a test section is displayed on the presentation screen, a total time for completing the test section and a countdown timer indicating a remaining time of the total time for completing the test section are simultaneously displayed on the presentation screen, and a progress indicator is displayed on the presentation screen,
wherein the progress indicator includes a pacing track positioned around the title, the total time, and the countdown timer, the pacing track having a plurality of distinct segments extending between a first end and a second end, each of the distinct segments representing a portion of the total time for completing the test section, the progress indicator further including a plurality of progress markers arranged along the pacing track, each progress marker being visually unique relative to each of the other progress markers for providing a visual indication of a corresponding portion of the test section that should be completed by a given time, and whereby a changeable visual indication responsive to the remaining time for completing the test section is provided with the progress indicator, including decreasing a size of the pacing track by displaying sequentially fewer of the distinct segments between the first and second ends in response to a decrease in the remaining time, the pacing device being further configured to selectively start and pause the countdown timer in each test mode section, and to select between the various test mode sections.

20. The test taking pacing device of claim 19, wherein the plurality of test mode sections includes an English test mode section having a total time of forty-five minutes, a Math test mode section having a total time of sixty minutes, a Reading test mode section having a total time of thirty-five minutes, a Science test mode section having a total time of thirty-five minutes, and a Writing test mode section having a total time of at least thirty minutes.

21. The test taking pacing device of claim 19, wherein the plurality of test mode sections includes an Essay test mode section, a Math test mode section, and a test mode section corresponding to a test section having at least one of a reading portion or a writing portion.

22. The test taking pacing device of claim 19, wherein the pacing track includes a tail segment at the second end, the pacing device being further configured to cause the presentation screen to display the tail segment differently than the remaining displayed segments of the pacing track.

23. A pacing device for use during an activity to be timed, comprising:
- a presentation screen,
- a plurality of selectors for operating the pacing device, and
- a processor operatively coupled to the presentation screen and the plurality of selectors, the processor being configured to:
  - in response to activation of a first selector of the plurality of selectors, cause the presentation screen to display a total time for completing the activity and a countdown timer reflecting the total time,
  - in response to activation of a second selector of the plurality of selectors, cause the presentation screen to display, with the countdown timer, a remaining time of the total time for completing the activity while the presentation screen displays the total time, and cause the presentation screen to further display a progress indicator simultaneously with and separate from the countdown timer,
  - wherein the progress indicator includes a pacing track positioned around the total time and the countdown timer, the pacing track having a plurality of distinct segments extending between a first end and a second end, each of the distinct segments representing a portion of the total time for completing the activity, the progress indicator further including a plurality of progress markers arranged along the pacing track, each progress marker being visually unique relative to each of the other progress markers for providing a visual indication of a corresponding portion of the activity that should be completed by a given time, and
  - cause the progress indicator to provide a changeable visual indication responsive to the remaining time for completing the activity, including causing a size of the pacing track to decrease by displaying sequentially fewer of the distinct segments between the first and second ends in response to a decrease in the remaining time.

24. The pacing device of claim 23, wherein the pacing track includes a tail segment at the second end, the processor being further configured to:
- in response to activation of the second selector, cause the presentation screen to display the tail segment differently than the remaining displayed segments of the pacing track.

25. The pacing device of claim 23, wherein the progress markers indicate a plurality of elements corresponding to the activity, the plurality of elements including at least one of a plurality of subparts of the activity or a plurality of elapsed increments of the total time for completing the activity.

* * * * *